Feb. 12, 1929.

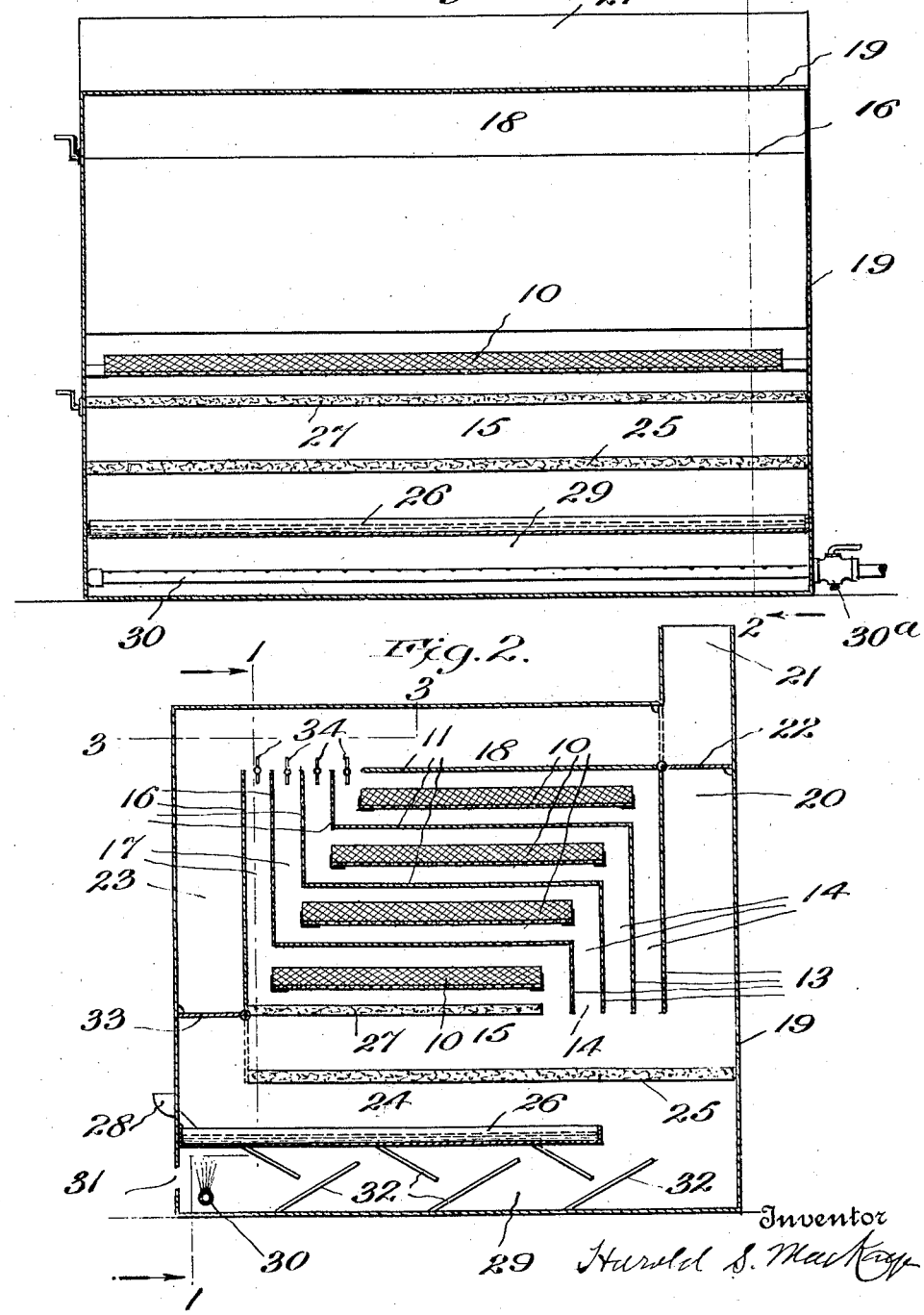

H. S. MacKAYE 1,701,813

DEHYDRATING APPARATUS

Filed Dec. 31, 1925    3 Sheets-Sheet 2

Inventor

Harold S. MacKaye

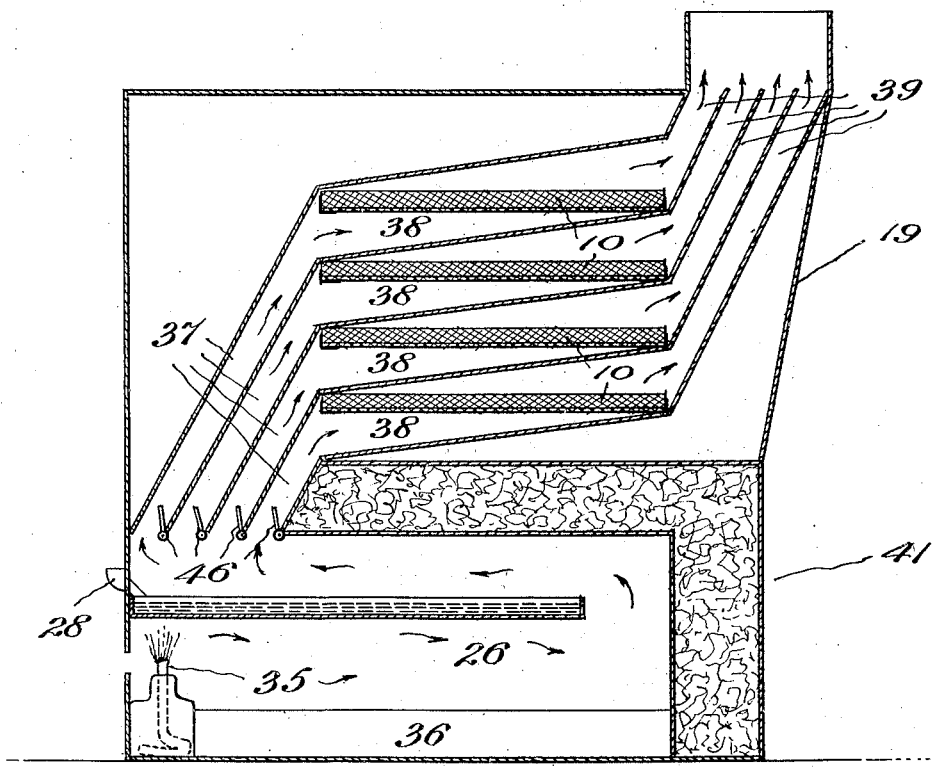

Patented Feb. 12, 1929.

1,701,813

UNITED STATES PATENT OFFICE.

HAROLD S. MacKAYE, OF YONKERS, NEW YORK, ASSIGNOR, BY MESNE ASSIGNMENTS, TO DRY FRESH PROCESS, INC., A CORPORATION OF NEW JERSEY.

DEHYDRATING APPARATUS.

Application filed December 31, 1925. Serial No. 78,679.

The present invention relates to a novel and improved process for the dehydration of fruits, vegetables etc. in a manner to permit satisfactory restoration of their original condition, by steeping in water; as well as to a novel apparatus for carrying out said process.

In order to prevent the discoloration or other objectionable alteration of certain fruit and vegetables, they should be dehydrated in an atmosphere as free from oxygen as possible, at least in the early stages of the process. It has also been found that during these earlier stages, the atmosphere to which the product is subjected should be fairly moist, thus preventing "case hardening" and rupture of the delicate cells.

The process of dehydration as usually practiced calls for a suitable heating of the product while causing a current of moisture-absorbing gas to pass over and around the product. Even where great care is exercised, it is virtually impossible to so pack some kinds of materials to be dehydrated that a substantially equal resistance will be opposed to flow of the gas in the different trays containing the material. Accordingly it is desirable that means be supplied for governing the rate of flow, and consequently the temperature, in each tray separately, in accordance with temperature indications existing from time to time.

The present invention provides for carrying out the requirements incident to the above conditions, and also presents other advantages hereinafter pointed out.

Figure 3:
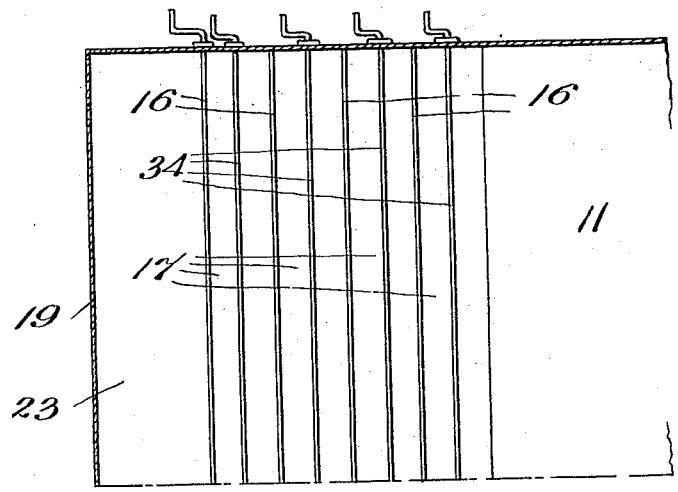
Figure 4:
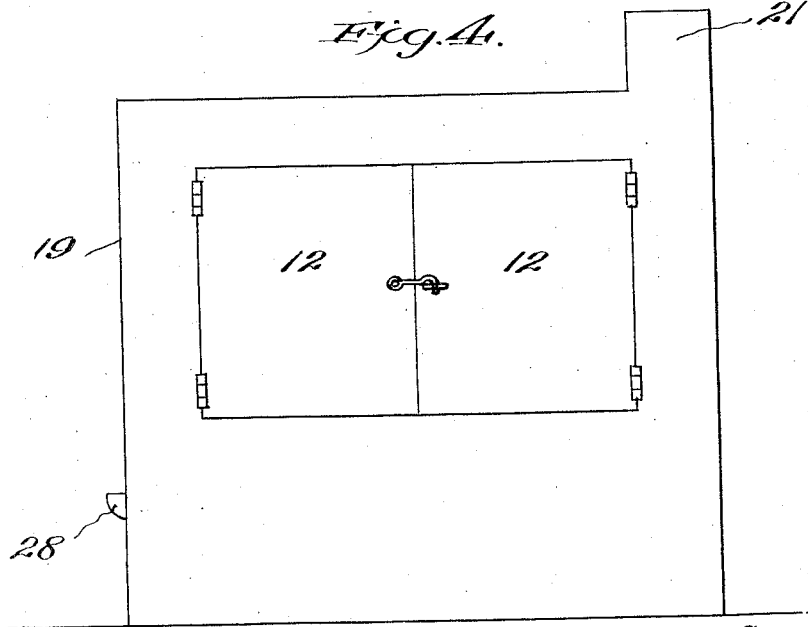

The invention is illustrated in certain preferred embodiments, shown by way of example, in the accompanying drawings, wherein Figure 1 is a vertical section of my apparatus on the line 1—1 in Figure 2, Figure 2 is a similar sectional view on the line 2—2 in Figure 1, Figure 3 is an enlarged horizontal sectional view of one side on the line 3—3 in Figure 2, Figure 4 is an end view of the apparatus, and Figure 5 is a transverse vertical section of a modified form of the device. The drawings are diagrammatic in character, and minor details of an obvious and well known nature are omitted for the sake of clearness.

The material to be dehydrated is disposed in any well known manner within shallow trays 10, which are preferably made of wire mesh, as coarse as is consistent with the size of the particles in the tray. Any form of tray or container known to be suitable for purposes of dehydration may of course, be used.

The containers 10 are supported in any suitable manner between horizontal partitions 11, being introduced through doors 12 at the front or back or both, if desired. The containers are placed in a uniformly slanting position as shown in Figure 2, and the partitions 11 are correspondingly placed, being located so as to leave a circulation space above and below each container.

At one side of the preferred device, vertical plates or partitions 13 depend from the edges of the partitions 11, to form flues 14 extending down to the main horizontal entrance flue 15. From the opposite edges of the partitions 11, vertical plates or partitions 16 rise to form the flues 17 which extend to the main upper horizontal flue 18. All of the partitions and plates 11, 13 and 16 extend from one end to the other of the main outer casing 19, or from left to right in Figure 1. My invention may be successfully carried out for some purposes, and, so far as reversal of gas currents is concerned, even where the partitions 13 and 16 are omitted.

At one side of the apparatus, between the outermost partition 13 and the main casing 19, a rising flue 20 extends from one end of the main entrance flue 15 to the exit flue or chimney 21, just below which this rising flue 20 joins the exit end of the upper cross flue 18. At this point a damper 22 or equivalent means is provided, whereby the openings from the respective flues 18 and 20 to the exit 21 may be controlled. As shown, the damper closes flue 20 and leaves 18 open.

At the opposite side of the apparatus, a second rising flue 23 extends from one end of the upper cross flue 18, down past the entrance to the cross flue 15, to the end of what may be called the supply flue 24. This flue runs parallel to the flue 15, and is bounded above and below respectively by the horizontal partitions 25 and 26.

The partition 25 extends from the right hand wall of the casing 19, in Figure 2, to a point at the left hand in that figure which is just below the right hand wall of the flue 23. This partition is preferably made double with insulating material such as asbestos or the like between the upper and lower plates, to prevent so far as possible undue heating from below by direct radiation. I also prefer to use an insulating layer over the top of the flue 15 as shown at 27, for the same reason.

The partition 26 is preferably a shallow water pan, which may be supplied with water through the entrance 28, or otherwise. This extends from directly under the flue 23 toward the right in Figure 2, far enough to leave an adequate opening into the flue 24 from the mixing flue 29.

All of the flues above described extend horizontally from end to end of the apparatus, by which is meant from right to left in Figure 1.

The heated gases employed in dehydration are products of a combustion which is kept as nearly perfect as possible, in order to unite as large a proportion of oxygen as possible with the carbon and hydrogen of the fuel preferably as $CO_2$ and $H_2O$ (gas). Moreover, it is highly desirable, in order to attain uniform and reliable performance, to supply the heated gases in equal quantities from end to end—or from the left to the right of the advancing current.

The above ends may be attained by burning oil or gas all along under the apparatus from one end to the other, as, for instance, by means of the gas pipe 30, having small openings at close intervals to produce burning gas jets which may be raised or lowered at will in any well known manner as by the valve 30$^a$ (see Figure 1). An opening 31 in the casing (see Figure 2) supplies the necessary air.

In order that the material may be uniformly treated, it is best to insure a thorough mixture of the gases that pass away from the point of combustion. Otherwise some of the unburned air, being very hot, becomes a detrimental oxidizing agent.

To accomplish this thorough commingling of the gases, I prefer to provide within the "mixing flue" 29 means for agitating the gases automatically as they travel forward under the influence of natural draft. One means that is found effective for this purpose comprises a series of oppositely sloping baffle plates 32, arranged as shown in Figure 2, and extending from end to end of the flue, that is from right to left in Figure 1.

It has been found by experience that stationary dehydrators depending upon connection or natural draft are often subject to two annoying disadvantages. One of these is a tendency to overheating in one or the other of the lower trays; which arises from their receiving an undue supply of heat by direct radiation from the incoming hot gases, before they divide to pass through the passages wherein the trays are located. To obviate this I employ the insulating partitions 25 and 27, one or both.

The second disadvantage is found in the tendency of the material to dry faster, and even sometimes to scorch, on that side of each tray where the hot gases are introduced than on the opposite, or outgoing, side of the tray. This disadvantage I overcome by providing means whereby the direction of travel of the gases may be reversed as frequently as desired. That is to say, the opposite sides or edges of each tray become incoming and outcoming sides in alternation. This contributes very materially to the uniformity of the results. While this feature is not essential to my invention, and is not shown in Figure 5 it is present in the more elaborate and perfected embodiment of the invention shown in Figures 1 to 4.

The reversal of gas currents is controlled by two dampers, in the specific form shown. One of these, already described, is the damper 22. The other is a similar damper 33, which in the position shown in Figure 2 closes communication from the flue 24 to the flue 23, and in the dotted line position shown in that figure, closes communication from 24 to 15, leaving access open to the flue 23.

One mode of operation may now be described. The material, properly distributed on the trays 10, having been introduced through doors 12, these are closed, and the gas is lighted at 30, the dampers 22 and 33 being in the positions shown in Figure 2.

The hot gases passing from the jets 30 are thoroughly mixed in the flue 29, and act to heat the water in the pan 26. Thus the gases take up moisture as they pass back over the pan 26 within the flue 24. These moist hot gases then pass by the main entrance flue 15 to the flues 14, by which the current is divided so that each tray 10 is surrounded by a separate gas stream. The gases pass partly over and under and partly through the layer of material in each tray, and thence by the flues 17 to the horizontal flue 18, which conducts them to the exit flue 21.

After a suitable interval, depending upon the nature and condition of the material treated, the dampers 22 and 33 are moved to the dotted line positions, whereupon the gases will pass first up the flue 23, then down the flues 17, over, under and downward through the material in the trays, then through the flues 14 and out through flues 20 and 21. It will be seen that this not only reverses the direction of the currents across the material but also through it, from upward to downward.

This alternation of current direction may be repeated as often as desired, and insures uniformity of results at the entrance and exit sides of the trays.

Inasmuch as the distribution of the gas currents through and around the respective trays depends to some extent upon the nature and distribution of the material on the respective trays, uniform gas distribution cannot be successfully attained once for all by the original construction of the apparatus. For this reason I have provided an entirely separate passage from the common flue 15 (or 18) to the common outlet flue 18 (or 15) for each tray.

Now, as soon as operation is begun, the temperature conditions in each passage may be kept under observation by appropriate use of electrothermic or other thermometers, and the separate individual dampers 34 may be so set that uniform results are attained.

It is to be understood that the moistening of the gases will ordinarily be only necessary during the earlier stages of the process. The length of time during which this moistening is continued is regulated by the amount of water that is supplied to the pan 26.

My perfected apparatus as shown in Figures 1 to 4 lends itself to carrying out a novel mode of treatment of the material, which is one of the features of my invention. This mode or process involves a novel step employed alone at the beginning of the treatment or repeated in alternation with other steps.

The novel step or operation in question may be termed "closed" heating, and may be carried out in the specific apparatus shown by placing each of the dampers 22 and 33 in the half-way or forty-five degree position, whereby the current issuing from the flue 24 is divided about equally between the flues 23 and 18 on the one hand and the flues 15 and 20 on the other hand. If desired the dampers 34 may be closed, as well. It is best to employ this step after the passages containing the trays 10 have been filled as far as possible with gases weak in oxygen. I prefer to accomplish this by setting one or the other of the dampers 22, 33, more or less out of the mean or forty-five degree position, thus permitting a slight balance of draft-inducing pressure one way or the other, to cause slow passage of the merely warm gases. This prevents preliminary overheating. Indeed any period of "closed" heating may be carried out in this manner, and this expression as used in my claims is not intended to apply only to the use of perfectly still air or gas around the trays. With the apparatus in this condition, the products of combustion pass all around the flues and ducts containing the material to be treated, and there is a slow drying without draft. The moisture of the material itself is thus kept in contact with the material, so as to prevent case hardening, and little or no water is necessary in the pan 26.

One important result of the use of this "closed" heating, when alternated with the active use of gas currents over the material in the ordinary manner is found in the economy of fuel; and this without any loss of time or impairment of results.

The heated gas currents ordinarily used have a double function. They warm the material to induce evaporation and moisture extraction, and they sweep away this moisture to get rid of it. The conditions best suited to one of these functions are not always best suited to the other. Rapid sweeping away of moisture is best accomplished by the swift convective currents induced by high temperatures. On the other hand prolonged exposure to high temperature is in many cases disadvantageous to proper dehydration—especially in the earlier stages of treatment. It becomes very advantageous therefore to accomplish the greater part of the moisture extraction by "closed heating" at a low temperature with the material in contact with its own moisture; while using the higher temperature for a relatively short time in active heating by contact with a rapid draft of hot gases which sweep away the moisture. This latter need only occupy a very small space of time, so that the material has not time to be detrimentally affected by the high temperature.

Furthermore, this process economizes fuel, because during the intervals of closed heating, the gas or oil flame may be turned low, and only be raised during the short intervals of rapid convection for sweeping out purposes.

Another way of getting this same result of alternate closed and open heating in each flue is as follows.

Assuming the dampers 22 and 33 to be set as shown in Figure 2, the gas is turned low. The dampers 34 are then all closed but one. The low-turned gas will produce plenty of heat for rapid convection to sweep out one tray-passage at a time, and, while this is going on, the material in the other tray passages is undergoing closed heating. By thus opening each passage in succession (keeping the others closed) and repeating the process as long as desired, the necessary alternation of closed and open heating may be carried on without turning the gas up and down. Of course this turning up and down of the gas is not essential in any case, but, where the first above described variant of my process is employed, it is desirable to save time.

The reversal of current is not so important, where closed and open heating are used in alternation, but it may be employed with advantage, even in this case. When so employed, it will be found well to reverse the current direction after each closed heating interval.

My invention is not necessarily embodied in a reversible device, and I have shown a modification containing some of the features of the invention in Figure 5.

In this form the heat is supplied by a long wick 35, running the entire length of the device, and drawing oil from the reservoir 36; although of course gas may be here used if desired.

The gases pass under and around the water pan 26, and separate currents are carried by the inclined flues 37 to the respective tray-containing ducts 38, which in this case are inclined, so that the gases pass entirely through the layers of material in the trays. From the ducts 38 the gases are led separately through the flues 39 to the exit chimney 21. The dampers 40 make it possible to accomplish individual current control in the separate tray-containing passages, for the purposes already described.

To prevent undue heating by direct radiation, insulation 41 is placed over and around the flues that lead the gases to the entrance flues 37.

My invention may be embodied in a great variety of forms, and by a number of variants of the process, by changes that will be obvious to those skilled in the art. I do not wish to be limited to the details herein shown and described.

What I claim is—

1. Dehydrating apparatus comprising a group of ducts adapted to receive containers for moist material, means for producing and directing a current of hot gases under and through said group, and a layer of heat insulating material under said group adapted to shield the lower ducts from direct heat radiation.

2. Dehydrating apparatus comprising a group of ducts adapted to receive containers for moist material, a water-pan partition below the same, a heat insulating partition between said group and said water pan, and means for causing a current of hot gases around said water pan and said insulating partition successively and then through said ducts.

3. Dehydrating apparatus, comprising means for supporting and enclosing the material to be treated, a source of hot products of combustion, a mixing duct for leading the products of combustion to the material to be treated, and agitating means within said duct adapted to direct the current of gases alternately up and down.

4. Apparatus as in claim 3, wherein the agitating means comprise a series of inclined baffle plates.

5. Apparatus as in claim 3 wherein one side of the mixing duct is a water pan.

6. Dehydrating apparatus comprising a group of mutually separated drying ducts, means for supplying drying gases thereto, means for leading said gases away therefrom, and means adapted to cause the gases from the supplying means to move either through said ducts or around the group of ducts at will.

7. Apparatus as in claim 6 in combination with a separate valve for each duct adapted to vary the resistance thereof to the passage of gas therethrough.

8. Dehydrating apparatus comprising a group of ducts for supplying drying gases, means for conveying said gases above, below and on two sides of said group, and means for controlling the passage of gases through said group of ducts.

9. Dehydrating apparatus comprising a group of ducts adapted to receive containers for moist material, an exit flue, a source of hot gases, passages leading around said group of ducts to said exit flue, and separate means for controlling admission of gases from said passages to each of said ducts.

10. The process of dehydrating food material for making the same fit for restoration by adding water which consists in subjecting the material to treatment involving preparatory heating in a relatively still drying atmosphere followed by the use of an active current of hot gases passing over the material.

11. The process of dehydration which consists in subjecting moist material to radiant heat in a relatively still drying atmosphere and to convective heating in an active current of hot gases, in alternation.

In testimony whereof I hereto affix my signature this 30th of December, 1925.

HAROLD S. MacKAYE.